Figure 1:
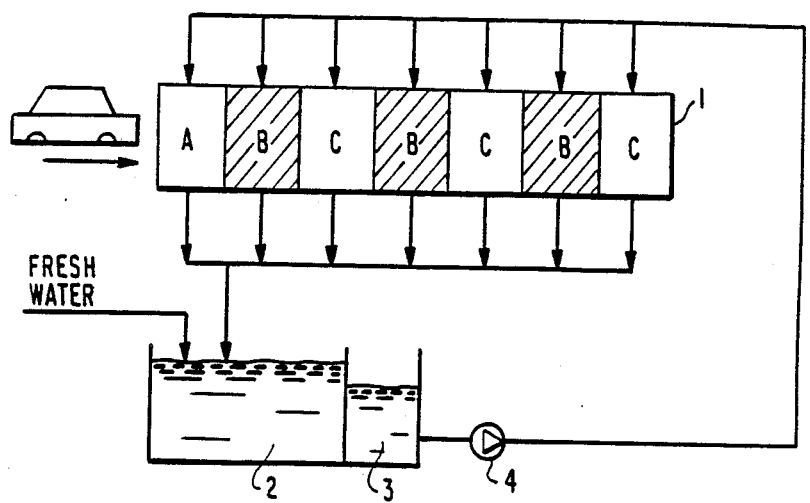

United States Patent [19]
Kraus et al.

[11] Patent Number: 4,895,100
[45] Date of Patent: Jan. 23, 1990

[54] PAINTING INSTALLATION

[75] Inventors: Reinhard Kraus, Holzgerlingen; Kurt Rapp, Eberdingen; both of Fed. Rep. of Germany

[73] Assignee: Daimler-Benz Aktiengesellschaft, Stuttgart, Fed. Rep. of Germany

[21] Appl. No.: 723,906

[22] Filed: Apr. 16, 1985

[30] Foreign Application Priority Data

Apr. 16, 1984 [DE] Fed. Rep. of Germany ....... 3414320

[51] Int. Cl.⁴ .............................................. B05B 15/12
[52] U.S. Cl. ................................... 118/326; 98/115.2; 55/DIG. 46
[58] Field of Search ...................... 55/85, 89, DIG. 46; 98/115.2; 118/326

[56] References Cited

U.S. PATENT DOCUMENTS

| 4,096,066 | 6/1978 | Kearney | 98/115.2 X |
| 4,261,707 | 4/1981 | Bradshaw | 118/326 |
| 4,397,662 | 8/1983 | Bloomer | 98/115.2 X |

FOREIGN PATENT DOCUMENTS 59-107085  6/1984  Japan .................................. 118/326

*Primary Examiner*—Shrive Beck

[57] ABSTRACT

A painting installation with several treatment zones and a system for washing-out paint mist by means of circulated water, in which for each treatment zone or group of treatment zones with similar solvent concentration in the exhaust air, a closed-cycle water circulation of its own is provided. The gasing out of solvents out of the water in zones with low solvent concentration is avoided thereby, and the solvent emission of the painting installation is markedly reduced.

2 Claims, 1 Drawing Sheet

PAINTING INSTALLATION

The present invention relates to a painting installation with several treatment zones including a system for washing out paint mists out of the exhaust air by water carried in the circulatory system.

Industrial paint spraying booths as are used, for example, in the automobile industry for painting body parts, are in practice subdivided into different working or operating areas. In addition to spraying zones (manual-/automatic), sanding zones, evaporating zones, flow zones and control zones are present as described, for example, in the DE-PS Nos. 28 27 244, 28 44 118 or 29 28 226.

Inlet air is supplied to the individual zones of the painting installation possibly with different velocities; the removed exhaust air is washed with water for the removal of paint mist and then according to the present state of the art frequently reaches the atmosphere without further treatment.

However, in particular with high solvent concentrations, the exhaust air should be subjected to an after-treatment for the removal of the solvent contents in order to reduce the solvent emission, for example, to an after-burning or an adsorption treatment with activated charcoal.

This after-treatment can be made more economical if the exhaust air washed by means of water is conducted back essentially into the painting booth while only a portion of the exhaust air is subjected in each case to the after-treatment (recirculation air process) and an amount of fresh air corresponding to this portion is added to the booth air. The recirculated air process is used preferably in zones with high solvent charges (spraying zones).

The washing out of paint particles out of the booth air takes place by washing with water (compare the aforementioned patents). Up to the present, only a single water circulation is thereby used for all treatment zones so that the exhaust air from zones in which a very high proportion in solvent is present in the exhaust air, and exhaust air from zones in which a very small solvent proportion is present in the exhaust air, are washed with the same washing water.

The washing water absorbs solvents in the washing-out system of a treatment zone in two forms; namely, in the form of solvents still bound to washed-out paint particles and solvents which are present in gaseous form in the spray booth exhaust air and are absorbed during the washing-out process.

The solvent absorption is dependent on the water solubility of the solvents, on the type of the washing-out system, and on the saturation condition of the washing-out water. In a zone with high solvent concentration in the exhaust air, the wash-out water therefore absorbs a relatively large amount of solvent. If this water now reaches in the circulatory system a zone with lower solvent concentration in the exhaust air, then the water gives off solvent to the exhaust air according to Henry's Laws. Since the exhaust air from the zones with low solvent concentration reaches directly the atmosphere, an unnecessary superfluous burden on the environment results therefrom.

The object of the present invention thus resides in preventing this superfluous burden on the environment by desorption of solvent out of the washing water.

The underlying problems are solved in a painting installation with several treatment zones having a system for washing-out paint mists out of the exhaust air by means of water carried in the circulatory system in that for each treatment zone or each group of treatment zones with essentially the same solvent concentration in the exhaust air, a separate closed cycle water circulation of its own is provided, i.e., each such treatment zone or each such group of treatment zones includes its own closed cycle water circulation.

As a result of this separation of the washing-out water circulations, washing-out water filled or charged strongly with solvents can no longer reach a zone in which only a smaller solvent concentration is present in the exhaust air and gives off thereat a part of the dissolved solvent to the exhaust air. In order to keep the apparatus expenditures within reasonable limits, one appropriately connects in larger painting installations, groups of treatment zones in which essentially the same solvent concentration exists in the exhaust air, to a common water circulation.

A further improvement is achieved if the water circulation of each treatment zone or group of treatment zones is connected with the water circulation of the treatment zone with the next lower solvent concentration in the exhaust air for the purpose of replenishing the evaporation losses and if only the water circulation of the treatment zone with the lowest solvent concentration in the exhaust air is connected to the fresh water supply. A portion of the solvents absorbed by the washing-out water from zones with low solvent concentration in the exhaust air can thus be conducted to the exhaust air purification in that the water evaporation losses of the highly concentrated zones equipped with exhaust purification are compensated with solvent-containing water from zones of low concentration. The overall evaporation loss of the spray booth washing-out system is added as fresh water in the zone of least solvent concentration (cascade principle).

The principle of the installation of the present invention thus resides in the fact that the harmful redistribution of solvents dissolved in the washing water is precluded and as a result thereof the exhaust air from the zones in which only a slight solvent concentration is present in the exhaust air and which is blown into the atmosphere without separate purification, is not additionally enriched with solvents. Particularly great advantages are attainable by the separation of the wash water circulations if one operates in individual zones, for example, in automated zones, with very high solvent concentrations in the air by reason of recirculated air conduction, in order to be able to carry out more cost-favorably the exhaust purification. In this case, the prevention of the redistribution of solvents by the water circulation becomes particularly effective.

It should also be mentioned parenthetically that it is appropriate not to permit the water, in particular, the water from water circulations with very high solvent concentration to gas-out in an uncontrolled manner, for example, in settling or clearing ponds or basins. It is recommended also in this case to close off the settling ponds, respectively, settling basins or tanks from the environment or to connect the gas space above these settling ponds or settling tanks to the exhaust air purification system.

Figure 2:
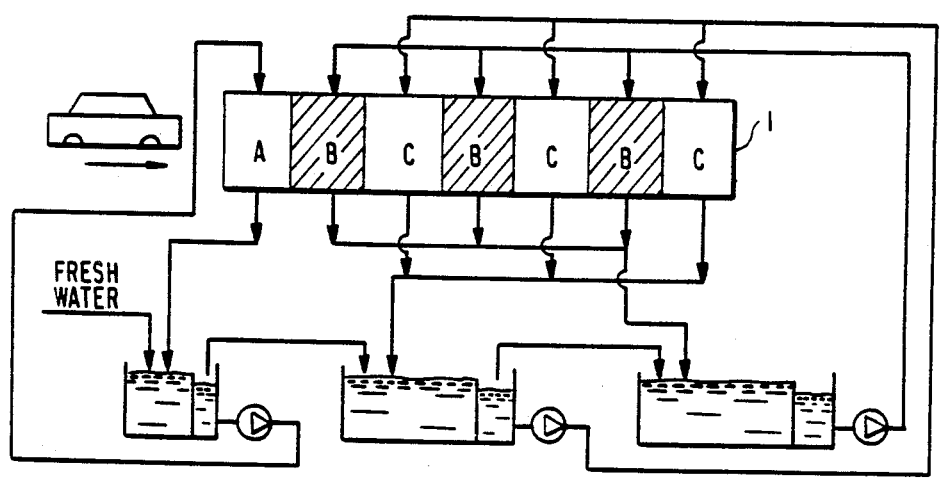

These and other objects features and advantages of the present invention will become more apparent from the following description when taken in connection with the accompanying drawing which shows, for purposes of illustration only, one embodiment in accordance with the present invention, and wherein:

FIG. 1 is a schematic view of a painting installation with customary water circulation; and FIG. 2 is a schematic view of a painting installation with separate closed cycle water circulations in accordance with the present invention.

Referring now to the drawing wherein like reference numerals are used throughout the two views to designate like parts, and more particularly to FIG. 1, a painting installation with customary washing water conduction is schematically illustrated in this figure. The vehicle, respectively, the body to be painted is transported from the left to the right through the paint booth 1. The painting installation includes three different types of zones: a sanding zone A in which the body or body parts to be painted are pretreated and in which practically no solvent components exist in the air, spraying zones B with very high solvent concentration in the exhaust air and a further group of zones C with low solvent concentration of the exhaust air in which no spraying takes place but which each are located to the rear or downstream of the spraying zones and which form flow zones, venting zones and similar zones. The washing water for the exhaust air is conducted in the circulation through the zones and reaches in common the settling or clearing tank 2 with an overflow compartment 3 in which precipitated paint particles are to settle and is pumped back from there into the individual zones by means of the pump 4 in the circulation.

FIG. 2 illustrates the same painting assembly line 1, however, the individual zones with same solvent concentration in the exhaust air are combined into separate closed cycle water circulations. One water circulation serves for washing out the exhaust air from the sanding zone A, a further circulation serves for the purification of the exhaust air in the zones C and a third circulation serves for the purification of the exhaust air in the zones B. Thus, for each water circulation also one settling tank with after-water-treatment or purification zone is present for each water circulation. For covering the evaporation losses in the individual zones, washing water from a zone with the next lower solvent concentration in the exhaust air is utilized in each case. The fresh water supply takes place in the circulation of the sanding zone A which has the lowest solvent concentration in the exhaust air.

EXAMPLE

The exhaust concentration in the individual zones of a spray booth according to FIG. 2 with three washing water circulations was determined.

The following conditions prevail in the spray booth: Rate of air flow per zone 50,000 $m^3$ per hour. Three spraying zones (B) in which 50 kg per hour of solvent each corresponding to 1,000 mg per $m^3$ of exhaust air evaporates. The exhaust air of these three spraying zones reaches the exhaust air purification system in which the solvent component is removed completely from the exhaust air. Furthermore, three flow zones C are present, in which 5 kg per hour of solvent corresponding to 100 mg of solvent per $m^3$ of exhaust air evaporate. The exhaust air of these zones is conducted directly into the atmosphere without exhaust air purification. Furthermore, a sanding zone A is additionally present in which no solvent evaporates.

Corresponding to these three concentration grades, the washing water is subdivided into three circulations for precluding the solvent redistribution. Test 1 indicates the solvent concentration in the exhaust air of the individual zones whereby the exhaust air of the spray zones B is conducted directly to the exhaust air purification system (exhaust air operation). Test 2 shows the solvent concentration in the exhaust air of the different zones for the case that in the spraying zones B the predominant portion of the air is conducted as recirculated air and only one third each of the recirculated air quantity of 50,000 $m^3$ per zone, i.e., 16.666 $m^3$ per hour and zone is conducted to the exhaust air purification system. In this case, considerably higher solvent concentrations result in the exhaust air which also have as a consequence a higher solvent concentration in the circulated wash water. Such a process which by reason of the higher solvent concentration in the exhaust air can be carried out generally only in automated spraying booths, offers advantages in the exhaust air purification by reason of its higher solvent concentration. The Tests 3 and 4 represent comparison tests to the Tests 1 and 2; in both of these Tests 3 and 4, only one common water circulation exists for all seven zones as shown in FIG. 1. The results are also indicated in the table. It becomes quite clear that of the sum of solvents, a considerably higher solvent proportion can be conducted to the exhaust gas purification system in the painting installation according to the present invention than in a prior art painting installation. Particularly noticeable is the result with a painting installation which includes modern automated spraying zones with partial recirculated air conduction.

TABLE

| | | Zones of the Painting Installation | | | | | | | | Σ solvent to the exhaust air purification | Σ solvent as emission out of zones A and C |
|---|---|---|---|---|---|---|---|---|---|---|---|
| | | A | B | C | B | C | B | C | Σ solvent | | |
| 1. according to the invention with exhaust air operation of the spraying zone | Solvent - concentration of the air (mg/$m^3$ air) | 0 | 1000 | 100 | 1000 | 100 | 1000 | 100 | — | — | — |
| | freight* (kg/h) | 0 | 50 | 5 | 50 | 5 | 50 | 5 | 165 (100%) | 150 (91%) | 15 (9%) |
| 2. according to the invention with circulated air operation of the spraying zone | Solvent - concentration of the air (mg/$m^3$ air) | 0 | 3000 | 100 | 3000 | 100 | 3000 | 100 | — | — | — |
| | freight* (kg/h) | 0 | 50 | 5 | 50 | 5 | 50 | 5 | 165 (100%) | 150 (91%) | 15 (9%) |
| 3. for comparison with exhaust air operation | Solvent - concentration of the air (mg/$m^3$ air) | 75 | 900 | 175 | 900 | 175 | 900 | 175 | — | — | — |

TABLE-continued

| | | Zones of the Painting Installation | | | | | | | Σ solvent | Σ solvent to the exhaust air purification | Σ solvent as emission out of zones A and C |
|---|---|---|---|---|---|---|---|---|---|---|---|
| | | A | B | C | B | C | B | C | | | |
| | freight* (kg/h) | 3,75 | 45 | 8,75 | 45 | 8,75 | 45 | 8,75 | 165 (100%) | 135 (82%) | 30 (18%) |
| 4. for comparison with circulated air operation of the spraying zone | Solvent - concentration of the air (mg/m³ air) | 173 | 2300 | 273 | 2300 | 273 | 2300 | 273 | — | — | — |
| | freight* (kg/h) | 8,7 | 38,5 | 13,7 | 38,5 | 13,7 | 38,5 | 13,7 | 165 (100%) | 115 (70%) | 50 (30%) |

*Amount of solvent in kg per hour carried by the air

While we have shown and described only one embodiment in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A painting installation operating with exhaust air and having several treatment zones, at least one of the treatment zones having a solvent concentration different from a solvent concentration in another treatment zone and the same solvent concentration in still another treatment zone, comprising means for washing-out paint mists out of the exhaust air by water carried in circulation means, at least the treatment zones having essentially similar solvent concentration being combined with a water circulation means of their own, which is separate from a water circulation system for a zone having different solvent concentrations, wherein the water circulation means of each separate or combined treatment zone is operatively connected for purposes of replenishing evaporation losses with the water circulating means of the treatment zone or zones having the next lower solvent concentration in the exhaust air, and wherein only the water circulation means of the treatment zone with the lowest solvent concentration in the exhaust air is operatively connected with a fresh water supply.

2. A painting installation according to claim 1, wherein a water circulation means of its own is provided for each treatment zone.

* * * * *